3,113,253
CAPACITORS
Yoshioki Ishikawa and Eiichi Okamoto, Tokyo, Japan, assignors to Nippon Electric Company, Limited, Tokyo, Japan, a corporation of Japan
Filed Aug. 3, 1959, Ser. No. 831,406
Claims priority, application Japan Sept. 22, 1958
2 Claims. (Cl. 317—258)

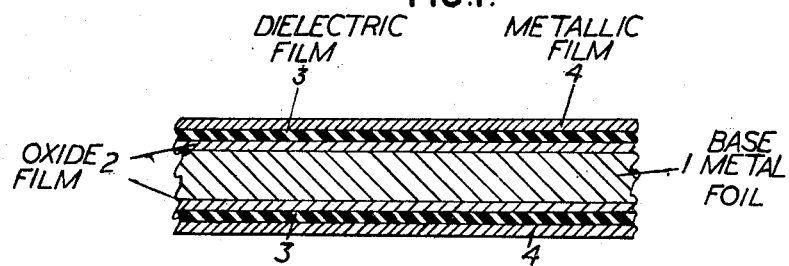
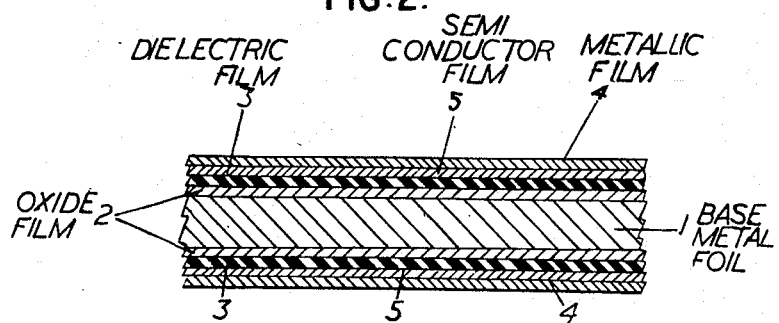

The present invention relates to laminated type capacitors and has for its principal object to provide a capacitor which has a lower leakage current than those heretofore known.

The invention is illustrated in the accompanying drawing in which:

FIG. 1 is a longitudinal sectional view of a laminated metal film used in making the capacitor of the invention; and FIG. 2 is a longitudinal sectional view of a modified laminated metal film used in making the capacitor.

The invention utilizes laminating films of different materials comprising a base metal, such as tantalum, aluminum, zirconium, titanium, etc., which is capable of being anodized to form an oxidized film, a dielectric film affixed thereupon which is tenacious both mechanically and thermally and is superior in dielectric characteristics, and a metallic film of aluminum, silver, or gold bonded thereto, either directly, or through the intermediary of a semiconductor film or germanium, silicon, lead sulphide, or cadmium sulphide.

In the drawing 1 denotes the base metal foil, possessed of the above-mentioned characteristics and having an oxidized film 2 formed on the surface of said metallic foil 1. A dielectric film 3 of magnesium fluoride ($MgF_2$), calcium fluoride ($CaF_2$), or silicon oxide (a mixture of $SiO_2$ and SiO), which is tenacious both mechanically and thermally and has good dielectric characteristics, is bonded by a suitable method to the oxidized film 2. In the embodiment of FIG. 1, a metallic film 4 of aluminum (Al), or silver (Ag), or gold (Au) is attached to said dielectric film 3 directly, whereas in the embodiment of FIG. 2, the metallic film 4 is bonded to the dielectric film 3 through the intermediary of a semiconductor film 5 of germanium, silicon, or other material. A capacitor may thus be formed by using the base metal foil 1 as anode and the metallic film 4 as cathode. With the above-mentioned construction, the thickness of the dielectric film 3 should be of the order of 150–100 millimicrons. In spite of the fact that the dielectric property of the oxidized film 2 is poor, the resistance of said dielectric film 3 is high. On the other hand, the thickness of the dielectric film 3 can be so adjusted that the resistance of said dielectric film 3 becomes much lower than that of the oxidized film 2. As a result, according to one experiment, there was a slight decrease in electric capacity of the capacitor, while the leakage current was lessened considerably.

With an operating voltage of 50 volts, the electric capacity, loss factor, and leakage current of the conventional capacitor which does not have the above-mentioned dielectric film 3 were 0.04 $\mu f./cm.^2$, 5% (tan $\delta$) (both measured at 1 kc.), and 1.0 $\mu a./F.V.$, respectively. These values for the capacitor in accordance with this invention are found to be less than 0.035 $f./cm.^2$, 5%, and 0.7 $\mu a./\mu F.V.$, respectively.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A capacitor comprising in combination a base metal foil, an oxide film formed on the surface of said foil, a film of mechanically and thermally tenacious dielectric selected from the group consisting of magnesium fluoride, calcium fluoride and silicon oxide on said oxide film, and a metallic film on said dielectric film.

2. A capacitor comprising in combination a base metal foil, an oxide film formed on the surface of said foil, a film of mechanically and thermally tenacious dielectric selected from the group consisting of magnesium fluoride, calcium fluoride and silicon oxide on said oxide film, a semiconductor film on said dielectric film, and a metallic film on said semiconductor film.

References Cited in the file of this patent

UNITED STATES PATENTS

| | | |
|---|---|---|
| 1,900,018 | Lilienfeld | Mar. 7, 1933 |
| 1,906,691 | Lilienfeld | May 2, 1933 |
| 2,504,178 | Burnham | Apr. 18, 1950 |
| 2,593,829 | Arledter | Apr. 22, 1952 |
| 2,614,524 | Haynes | Oct. 21, 1952 |
| 2,734,478 | Reynolds et al. | Feb. 14, 1956 |